(12) United States Patent
Shimada

(10) Patent No.: US 10,926,340 B2
(45) Date of Patent: Feb. 23, 2021

(54) CHAMFERING DEVICE AND CHAMFERING METHOD

(71) Applicant: KAWASAKI JUKOGYO KABUSHIKI KAISHA, Hyogo (JP)

(72) Inventor: Masahiro Shimada, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 16/445,460

(22) Filed: Jun. 19, 2019

(65) Prior Publication Data

US 2020/0009665 A1    Jan. 9, 2020

(30) Foreign Application Priority Data

Jun. 19, 2018  (JP) .............................. JP2018-116213

(51) Int. Cl.
  *B23C 3/12*     (2006.01)
  *B23Q 9/00*    (2006.01)
  *B23C 3/16*     (2006.01)

(52) U.S. Cl.
  CPC ................ *B23C 3/126* (2013.01); *B23C 3/12* (2013.01); *B23Q 9/0028* (2013.01); *B23C 3/16* (2013.01);
  (Continued)

(58) Field of Classification Search
  CPC ... Y10T 409/304144; Y10T 409/30672; Y10T 409/308176; Y10T 409/3084;
  (Continued)

(56) References Cited

U.S. PATENT DOCUMENTS

| 3,126,793 A * | 3/1964 | Jennings et al. .......... B23C 3/34 |
| | | 409/184 |
| 4,946,323 A * | 8/1990 | Kazama .................. B23C 3/126 |
| | | 409/180 |

(Continued)

FOREIGN PATENT DOCUMENTS

CH            708612 A1 *  3/2015
JP       56-157912 A *  12/1981
(Continued)

OTHER PUBLICATIONS

Machine Translation of JP 11-09071 9 A, which JP '719 was published Apr. 1999.*

*Primary Examiner* — Erica E Cadugan
(74) *Attorney, Agent, or Firm* — Studebaker & Brackett PC

(57) ABSTRACT

A chamfering device includes: a main body including, at a proximal end side thereof, a shank to be attached to a main shaft of a machine tool, the main body including, at a distal end side thereof, a shaft portion extending in a rotational axis direction; a movable body whose proximal end portion is mounted to the shaft portion, the movable body being configured to rotate together with the shaft portion and be movable in the rotational axis direction; an urging member configured to urge the movable body in a direction toward the distal end of the main body; a chamfering tool mounted to a distal end portion of the movable body and configured to rotate together with the movable body to perform chamfering on an edge portion of a workpiece; and a following member mounted to the movable body such that a position of the following member relative to the movable body in the rotational axis direction is invariable and the following member is rotatable relative to the movable body, the (Continued)

following member being configured such that a distal end thereof comes into contact with a surface of the workpiece.

5 Claims, 7 Drawing Sheets

(52) U.S. Cl.
CPC ...... *B23C 2220/16* (2013.01); *B23C 2220/40* (2013.01); *B23C 2255/08* (2013.01); *B23C 2270/18* (2013.01); *Y10T 409/303808* (2015.01); *Y10T 409/304144* (2015.01); *Y10T 409/308624* (2015.01)

(58) Field of Classification Search
CPC ............ Y10T 409/308624; B23C 3/12; B23C 2220/16; B23C 3/126; B23C 2255/08; B23C 2255/12
USPC .................. 409/138, 184, 210, 214, 218
See application file for complete search history.

(56) References Cited

U.S. PATENT DOCUMENTS

| | | | | |
|---|---|---|---|---|
| 5,312,212 A * | 5/1994 | Naumec | ............... | B23C 3/12 |
| | | | | 409/138 |
| 7,497,648 B2 * | 3/2009 | Muselli | ............... | B23C 3/126 |
| | | | | 409/138 |
| 7,635,242 B2 * | 12/2009 | Jeon | ............... | B23C 3/126 |
| | | | | 409/138 |
| 8,100,613 B2 * | 1/2012 | Foletti | ............... | B23Q 5/045 |
| | | | | 409/186 |
| 8,348,560 B1 * | 1/2013 | Furman | ............... | B23C 3/12 |
| | | | | 409/138 |

FOREIGN PATENT DOCUMENTS

| | | | |
|---|---|---|---|
| JP | 11-090719 A | * | 4/1999 |
| JP | 2002239824 A | | 8/2002 |

* cited by examiner

CHAMFERING DEVICE AND CHAMFERING METHOD

CROSS-REFERENCE TO RELATED APPLICATION

This application claims priority to and the benefit of Japanese Patent Application No. 2018-116213, filed on Jun. 19, 2018, the entire disclosure of which is incorporated herein by reference.

BACKGROUND OF THE INVENTION

Field of the Invention

The present disclosure relates to a chamfering device for and a chamfering method of performing chamfering on, for example, a cut-out part of, for example, the bodyshell of a transport vehicle.

Description of the Related Art

Conventionally, when cut-out processing is performed on a plate-shaped workpiece, for example, the bodyshell of a transport vehicle such as a railcar, the resulting cut-out part is subjected to chamfering, in which a closed edge line portion of the cut-out part is chamfered. In this case, the chamfering is manually finished by a worker using a hand tool. Therefore, the worker is required to have highly proficient skills. In addition, the thickness of the workpiece varies depending on at which portion of the workpiece the thickness is measured (i.e., thickness errors). For this reason, it has been difficult to precisely achieve an intended chamfering shape.

Japanese Laid-Open Patent Application Publication No. 2002-239824 discloses a configuration for performing chamfering, in which a cutting tool such as an end mill is attached to a robot. This configuration includes a cylindrical following guide member in which the cutting tool such as an end mill is fitted by insertion. The following guide member is provided with an opening through which a part of the cutting tool is exposed. The opening is moved along a portion to be chamfered, and thereby the chamfering is performed with the exposed part of the cutting tool, which is exposed through the opening.

SUMMARY OF THE INVENTION

In a case where cut-out processing is performed on a plate-shaped workpiece, such as the bodyshell of a transport vehicle as mentioned above, the resulting cut-out part is subjected to chamfering, in which a closed edge line portion (edge portion) of the cut-out part is chamfered. Since the edge portion may extend in a curved manner, or the direction in which the edge portion extends may vary, if the configuration of Patent Literature 1 is applied in this case, it is necessary to change the facing direction of the opening of the following guide member, and also, if the opening is formed in the side face of the cutting tool, it is necessary to change the orientation of the following guide member and the cutting tool. Such orientation control is considered to be difficult.

The present disclosure has been made in order to solve the above-described problems, and an object of the present disclosure is to provide a chamfering device and a chamfering method that make it possible to readily and precisely achieve an intended chamfering shape even if the workpiece varies in thickness, without requiring difficult tool orientation control.

In order to achieve the above object, a chamfering device according to one aspect of the present disclosure includes: a main body including, at a proximal end side thereof, a shank to be attached to a main shaft of a machine tool, the main body including, at a distal end side thereof, a shaft portion extending in a rotational axis direction; a movable body whose proximal end portion is mounted to the shaft portion, the movable body being configured to rotate together with the shaft portion and be movable in the rotational axis direction; an urging member configured to urge the movable body in a direction toward the distal end of the main body; a chamfering tool mounted to a distal end portion of the movable body and configured to rotate together with the movable body to perform chamfering on an edge portion of a workpiece; and a following member mounted to the movable body such that a position of the following member relative to the movable body in the rotational axis direction is invariable and the following member is rotatable relative to the movable body, the following member being configured such that a distal end thereof comes into contact with a surface of the workpiece.

According to the above configuration, in a state where the distal end of the following member is brought into contact with the surface of the workpiece by the urging force of the urging member, while the distal end of the following member is being moved along the surface, the chamfering tool is rotated to perform the chamfering. Here, in accordance with variation in the thickness of the workpiece, the urging member stretches/compresses, and thereby the chamfering tool is displaced in the axis direction together with the following member. As a result, the chamfering shape is invariable. Therefore, even if the workpiece has a varying thickness, an intended chamfering shape can be readily and precisely achieved. Also, even if the direction in which the edge portion to be chamfered extends varies, the chamfering tool is only required to be kept in such an orientation that the axis direction thereof is orthogonal to the surface of the workpiece, and difficult orientation control of the chamfering tool is not required.

A chamfering method according to another aspect of the present disclosure is a chamfering method executed by using the above-described chamfering device. The chamfering method includes: performing cut-out processing of cutting a predetermined portion away from a plate-shaped workpiece by moving a cutting tool attached to the machine tool relative to the workpiece; and then attaching the chamfering device to the machine tool instead of the cutting tool, and performing chamfering on an edge portion of the workpiece, the edge portion being formed when the predetermined portion is cut away from the workpiece, the chamfering being performed such that a movement path of the chamfering tool of the chamfering device as seen in the axis direction coincides with a movement path of the cutting tool as seen in the axis direction when the cut-out processing is performed.

According to this method, when performing the chamfering, the movement path of the cutting tool as seen in the axis direction is used as the movement path of the chamfering tool as seen in the axis direction, and the tool path of the chamfering tool can be determined by merely setting the position of the chamfering tool in the axis direction. In this manner, the chamfering can be readily performed by utilizing the tool path (the movement path as seen in the axis direction) of the cutting tool. It should be noted that since the method uses the above-described chamfering device, the method provides the same advantageous effects as those provided by the chamfering device.

The above and other objects, features, and advantages of the present disclosure will more fully be apparent from the following detailed description of a preferred embodiment with accompanying drawings.

The present disclosure includes the above-described configurations, and has an advantage of being able to provide a chamfering device and a chamfering method that make it possible to readily and precisely achieve an intended chamfering shape even if the workpiece varies in thickness, without requiring difficult tool orientation control.

DESCRIPTION OF THE EMBODIMENTS

Figure 1:
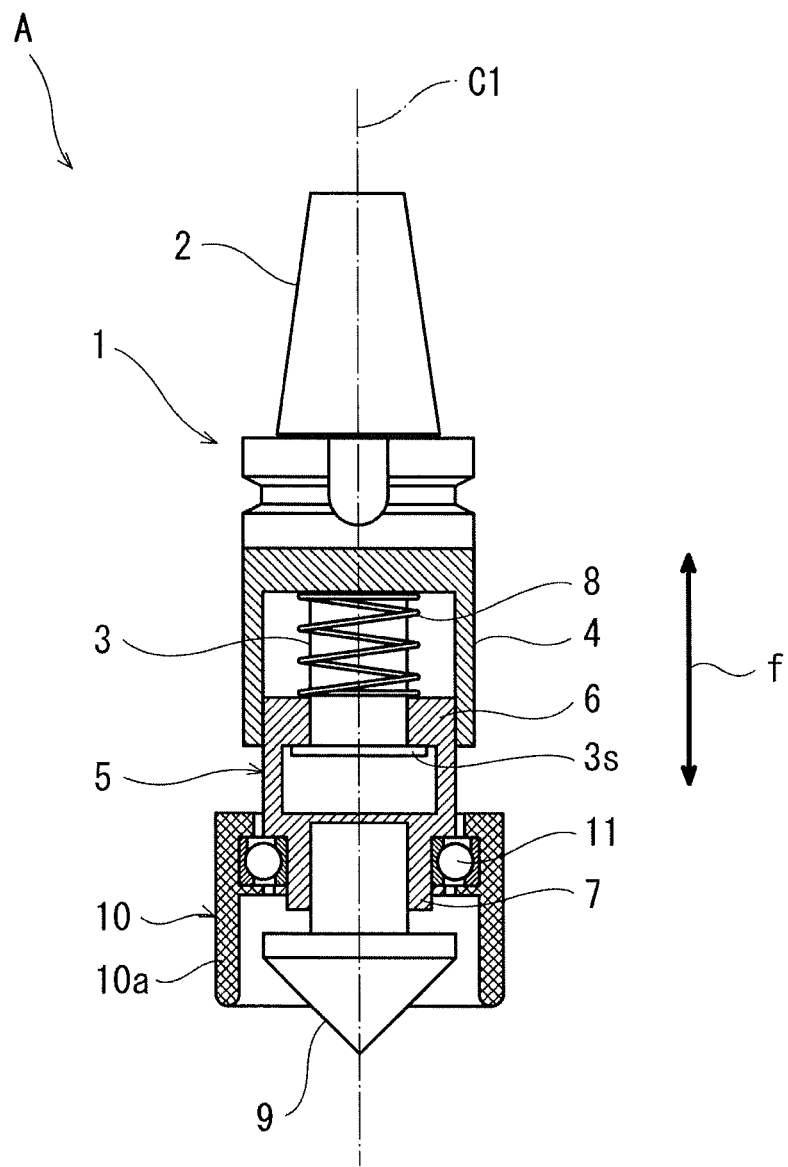
FIG. 1 is a schematic side view showing one example of a chamfering device of an embodiment of the present disclosure.

Hereinafter, a preferred embodiment of the present disclosure is described with reference to the drawings. In the drawings, the same or corresponding elements are denoted by the same reference signs, and repeating the same descriptions is avoided below. The drawings show each component schematically in order to facilitate the understanding thereof. Therefore, in some cases, the drawings may not display precise shapes, dimensional ratios, etc. The present disclosure is not limited to the embodiment described below.

FIG. 1 is a schematic side view showing one example of a chamfering device of the present embodiment.

The chamfering device A includes, for example, a main body 1, a movable body 5, a compression spring 8 serving as an urging member, a chamfering tool 9, and a following member 10.

The main body 1 includes, at the proximal end side thereof, a shank 2 to be attached to the main shaft of a machine tool. The main body 1 further includes, at the distal end side thereof, a spline shaft (shaft portion) 3 and a tubular portion 4. As one example, the shank 2 herein is a BT (Bottle Taper) shank. The spline shaft 3 extends in the rotational axis direction of the main shaft of the machine tool (i.e., extends in the axis direction of a rotational axis C1), and is provided inside the tubular portion 4. The rotational axis C1 of the main shaft of the machine tool coincides with the rotational axis of the chamfering device A, and the rotational axis direction of the main shaft of the machine tool and the rotational axis direction of the chamfering device A also coincide with each other as the direction indicated by arrow f. Hereinafter, the rotational axis direction of the chamfering device A is simply referred to as "the axis direction".

The proximal end portion of the movable body 5 is configured as a spline nut 6, which is mounted to the spline shaft 3, and the movable body 5 is configured to rotate together with the spline shaft 3 and be movable in the axis direction. The movable body 5, which is provided inside the tubular portion 4, is fitted in the tubular portion 4 such that the movable body 5 is slidable in the axis direction.

The compression spring 8 is attached to the spline shaft 3. The compression spring 8 urges the movable body 5 in a direction toward the distal end of the main body 1. The distal end of the spline shaft 3 is provided with a stopper 3s so that detachment of the movable body 5 will be prevented.

A collet chuck 7 is provided inside the distal end portion of the movable body 5. The chamfering tool 9 is fixed to the distal end side of the movable body 5 by the collet chuck 7. The chamfering tool 9 may be configured as an electroplated grinding wheel, or may be configured as a plurality of carbide blades.

The following member 10 is mounted to the outside of the distal end portion of the movable body 5 via a bearing 11. Accordingly, the position of the following member 10 relative to the movable body 5 in the axis direction is invariable, and the following member 10 is rotatable relative to the movable body 5. The following member 10 includes a cylindrical portion 10a, which has a circular cylindrical shape and is disposed around the outer periphery of the chamfering tool 9. The following member 10 is configured such that the distal end of the cylindrical portion 10a comes into contact with the surface of a workpiece that is subjected to chamfering.

In the chamfering device A, the movable body 5 and the chamfering tool 9 rotate together with the main body 1 including the spline shaft 3. However, the following member 10 need not rotate.

Figure 2A:
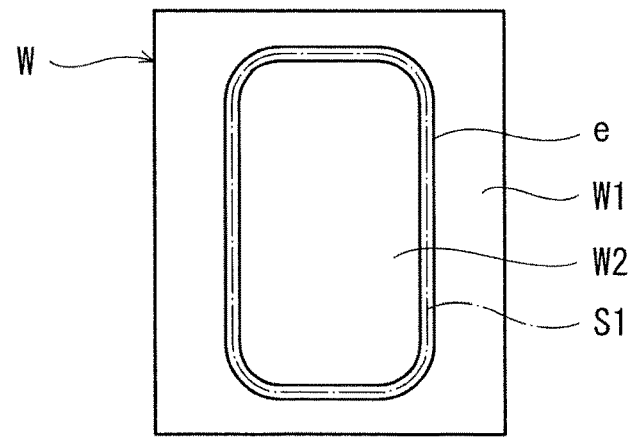
FIG. 2A is a plan view showing one example of a workpiece.
Figure 2B:
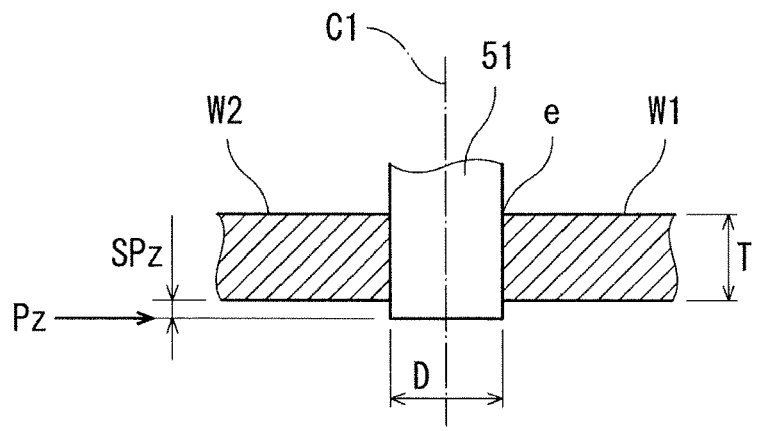
FIG. 2B shows cutting performed on the workpiece.
Figure 2C:
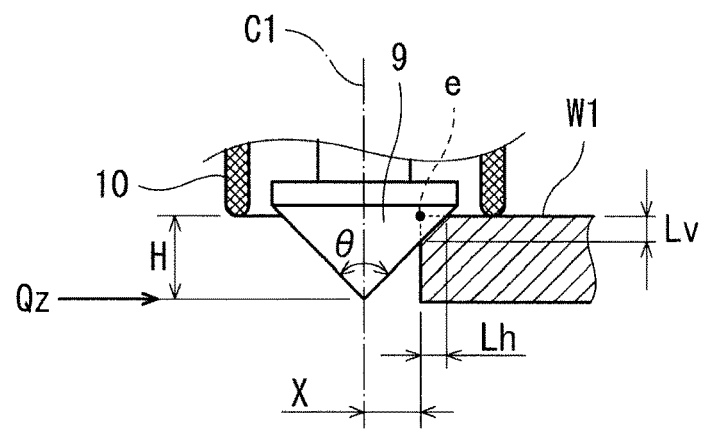
FIG. 2C shows chamfering performed on the workpiece.

Next, one example of a method of using the chamfering device A is described. FIG. 2A is a plan view showing one example of the workpiece. FIG. 2B shows cutting performed on the workpiece. FIG. 2C shows chamfering performed on the workpiece. It should be noted that, in FIG. 2C, the position of the distal end of the chamfering tool 9 and the position of the distal end of the following member 10 relative to each other in the axis direction are different from those shown in FIG. 1 in order to facilitate the understanding of the description below. However, in fact, their positions relative to each other in the axis direction are the same both in the case of FIG. 2C and in the case of FIG. 1.

FIG. 2A shows a workpiece W. The workpiece W is, for example, a plate-shaped workpiece such as the bodyshell of a railcar. After cut-out processing is performed on the workpiece W, the workpiece W is subjected to chamfering. In this example, the workpiece W is subjected to cutting in which a cut-away portion W2 is cut away from the workpiece W. Thereafter, the resulting workpiece W1, from which the cut-away portion W2 has been cut away, is subjected to chamfering in which an edge e of the workpiece W1 is chamfered. The edge e forms a closed edge line.

In the above cutting, as shown in FIG. 2B, for example, an end mill is used as a cutting tool 51 of a cutting device attached to the machine tool. When seen in a plan view (i.e., when seen in the axis direction), the cutting is performed such that the rotational axis C1 of the main shaft passes through a predetermined tool path S1 of the cutting tool 51, and thereby the cut-away portion W2 is cut away.

Next, in place of the cutting device, the chamfering device A including the chamfering tool 9 is attached to the machine tool, and then as shown in FIG. 2C, the chamfering is performed such that the rotational axis C1 of the main shaft passes through the same tool path S1 as in the above case of the cutting tool 51 (however, the position in the axis direction is based on a separately calculated value). Thus, when seen in a plan view, the chamfering tool 9 and the cutting tool 51 share the same tool path S1. In other words, the movement path of the chamfering tool 9 as seen in the axis direction coincides with the movement path of the cutting tool 51 as seen in the axis direction.

The machine tool may include an ATC (automatic tool changer) such that the cutting device and the chamfering device A are automatically switched with each other.

Hereinafter, the manner of determining the principal dimensions of the chamfering tool 9, the manner of determining the tool path of the chamfering tool 9 in a case where the tool path S1 of the cutting tool 51 is utilized as described above, etc., are described. In the description below, since the rotational axis of the chamfering tool 9 and the rotational axis of the cutting tool 51 coincide with the rotational axis C1 of the main shaft of the machine tool, each of the rotational axis of the chamfering tool 9 and the rotational axis of the cutting tool 51 is denoted by the same reference sign "C1".

First, as shown in FIG. 2C, a desired chamfering shape is indicated by lengths Lh and Lv of a chamfered portion. The lengths Lh and Lv are each measured from the edge e. The vertical angle θ of the chamfering tool 9 is represented by an equation shown below.

$$\theta = 2\tan^{-1}(Lh/Lv)$$

When the distance between the rotational axis C1 of the chamfering tool 9 and the edge e is X, the distance H from the distal end of the following member 10 (i.e., from the surface of the workpiece W1) to the distal end of the chamfering tool 9 is represented by an equation shown below.

$$H = (Lh+X)/\tan(\theta/2)$$

In the case of utilizing the tool path S1 of the cutting tool 51, specifically, the distance shown in FIG. 2B between the rotational axis C1 of the cutting tool 51 and the edge e is equal to the distance X shown in FIG. 2C between the rotational axis C1 of the chamfering tool 9 and the edge e. Accordingly, when the diameter of the cutting tool 51 is D, X=D/2. In this case, the distance H from the distal end of the following member 10 to the distal end of the chamfering tool 9 is represented by an equation shown below.

$$H = (Lh+D/2)/\tan(\theta/2)$$

Next, in relation to the case of utilizing the tool path S1 of the cutting tool 51, a distal end position Pz of the cutting tool 51 and a distal end position Qz of the chamfering tool 9 in the axis direction are described.

As shown in FIG. 2B, when the cutting tool 51 projects by a projection amount SPz and the minimum value of the thickness T of the workpiece W is Tmin, the position of the surface of the workpiece W is SPz+Tmin.

Here, a correction amount δz of the distal end position Qz of the chamfering tool 9 relative to the distal end position Pz of the cutting tool 51 is represented by an equation shown below.

$$\delta z = (SPz+T\min)-H$$

The distal end position Qz of the chamfering tool 9 in the axis direction is represented by an equation shown below.

$$Qz = Pz + \delta z$$

Thus, in the case of utilizing the tool path S1 of the cutting tool 51 (i.e., in the case of using the movement path of the cutting tool 51 as seen in the axis direction) as the tool path of the chamfering tool 9, the chamfering can be performed by calculating and setting only the distal end position Qz of the chamfering tool 9 in the axis direction. It should be noted that in a case where the thickness T of the workpiece W is greater than the minimum value Tmin, the difference from the minimum value Tmin is absorbed by displacements of the following member 10 and the chamfering tool 9, which are mounted to the movable body 5, in the axis direction.

In the description herein, the chamfering tool 9 has an inverted conical shape. However, the distal end portion of the inverted conical shape may be cut away, and thus the chamfering tool 9 may be in the shape of an inverted circular truncated cone. In this case, the aforementioned vertical angle θ of the chamfering tool 9, the distance H from the distal end of the following member 10 to the distal end of the chamfering tool 9, and the distal end position Qz of the chamfering tool 9 may be determined assuming that the distal end portion of the inverted conical shape is present.

Figure 3B:
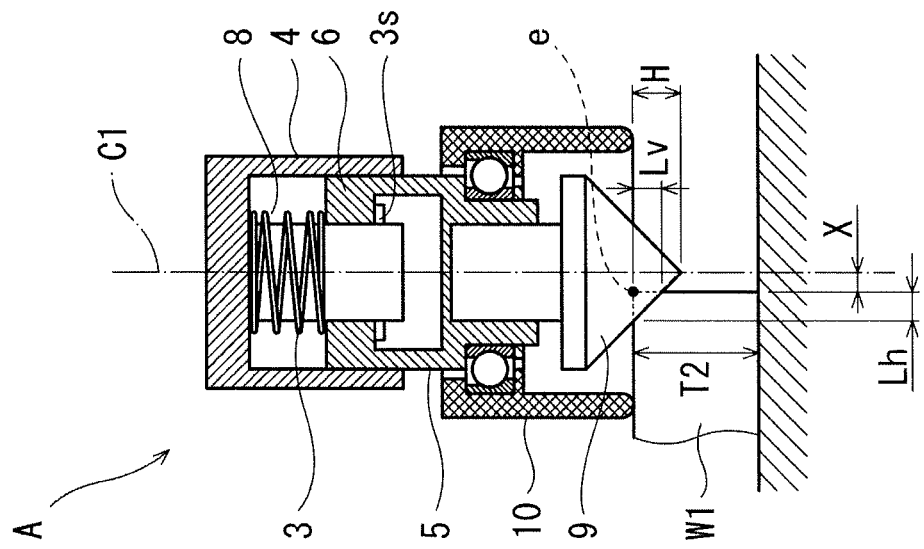
FIG. 3B shows the state of the essential part of the chamfering device in a case where the thickness of the workpiece to be chamfered varies depending on at which portion of the workpiece the thickness is measured.
Figure 3A:
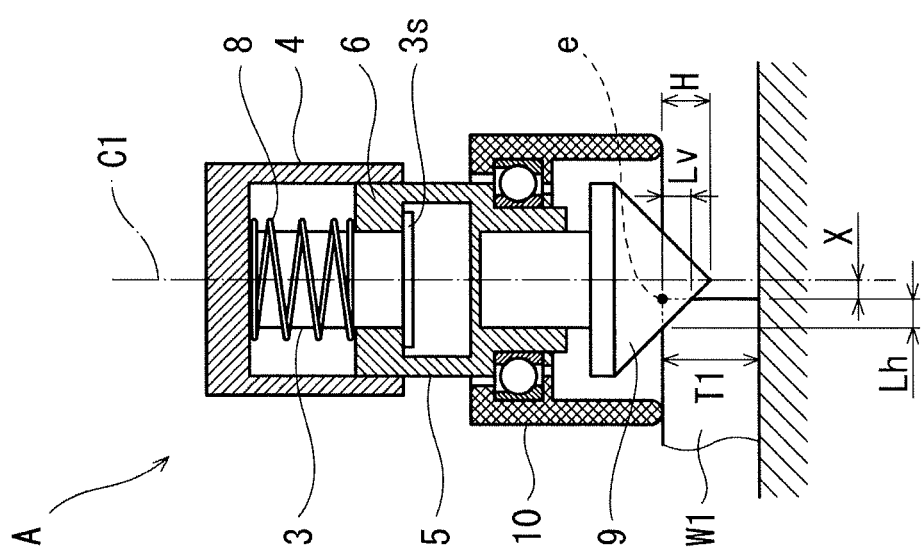
FIG. 3A shows the state of an essential part of the chamfering device in a case where the thickness of the workpiece to be chamfered varies depending on at which portion of the workpiece the thickness is measured.

Next, each of FIGS. 3A and 3B shows the state of an essential part of the chamfering device A in a case where the thickness of the workpiece W1 to be chamfered varies depending on at which portion of the workpiece W1 the thickness is measured (i.e., in a case where the workpiece W1 has a varying thickness). FIG. 3A illustrates chamfering performed on a portion of the workpiece W1, the portion having the minimum thickness (T1). FIG. 3B illustrates chamfering performed on a portion of the workpiece W1, the portion having a thickness (T2) greater than the minimum thickness (T1).

As shown in FIGS. 3A and 3B, in a state where the distal end of the following member 10 is brought into contact with the surface of the workpiece W1 by the urging force of the compression spring 8, while the distal end of the following member 10 is being moved along the surface, the chamfering tool 9 is rotated to perform the chamfering. Here, in accordance with variation in the thickness of the workpiece W1, the compression spring 8 stretches/compresses, and thereby the chamfering tool 9 is displaced in the axis direction together with the following member 10. Therefore, even if the workpiece W1 has a varying thickness, the distance H from the distal end of the following member 10 to the distal end of the chamfering tool 9 in the axis direction is invariable, and the distance X between the edge e of the workpiece W1 and the rotational axis C1 of the chamfering tool 9 is invariable. Accordingly, the chamfering shape is (i.e., the lengths Lh and Lv of the chamfered portion are) invariable.

As described above, in accordance with variation in the thickness of the workpiece W1, the compression spring 8 of the chamfering device A stretches/compresses, and thereby the chamfering tool 9 is displaced in the axis direction together with the following member 10. Therefore, even if the workpiece W1 has a varying thickness, the chamfering shape is invariable, which makes it possible to readily and precisely achieve an intended chamfering shape.

Figure 4:
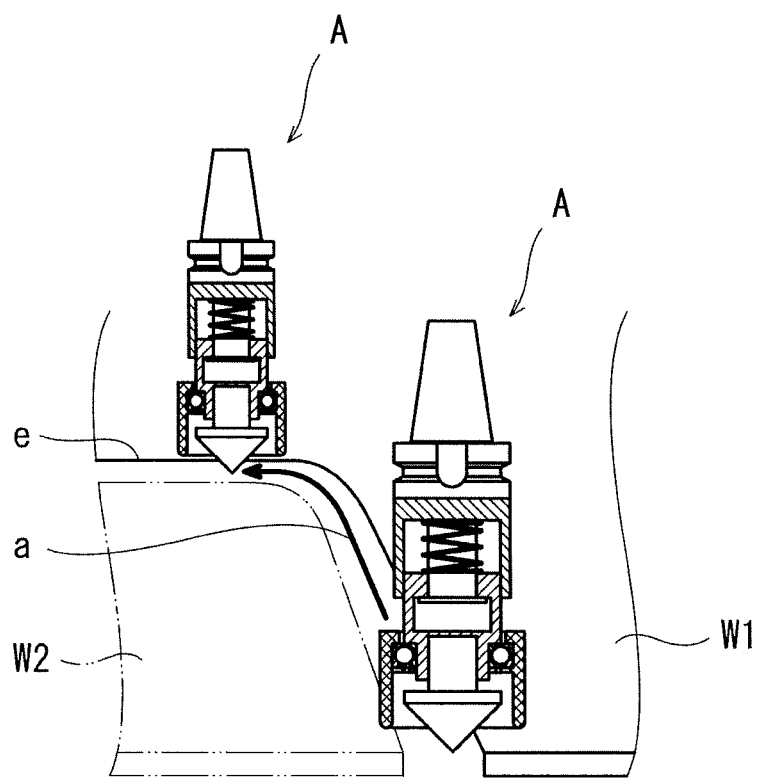
FIG. 4 shows the orientation of the chamfering device in a case where the direction in which an edge to be chamfered extends varies.

FIG. 4 shows the orientation of the chamfering device A in a case where the direction in which the edge e to be chamfered extends varies. Even if the direction in which the edge e extends varies as indicated by arrow a in FIG. 4, chamfering that achieves a chamfering shape as designed can be performed by moving the chamfering device A along the edge e of the workpiece W1 without changing the orientation of the chamfering device A. Thus, the chamfering tool 9 is only required to be kept in such an orientation that the axis direction thereof is orthogonal to the surface of the workpiece W1, and difficult orientation control of the chamfering tool 9 is not required.

Figure 5:
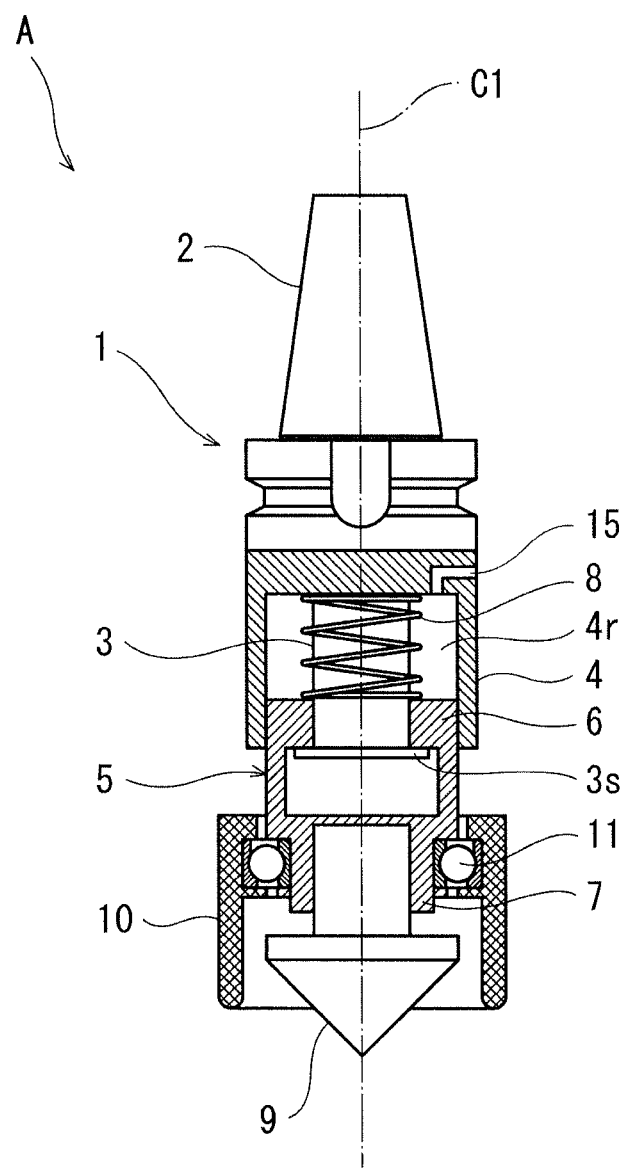
FIG. 5 is a schematic side view showing another example of the chamfering device of the present embodiment.

FIG. 5 is a schematic side view showing another example of the chamfering device of the present embodiment.

The chamfering device A shown in FIG. 5 includes an air vent hole 15 formed in the main body 1 in addition to the configuration shown in FIG. 1. Except the formation of the air vent hole 15, the configuration shown in FIG. 5 is the same as the configuration shown in FIG. 1. The movable body 5 is fitted in the tubular portion 4 of the main body 1 such that the movable body 5 is slidable. Vibration caused by, for example, machining reaction force can be reduced by setting high the air tightness in a space 4r formed inside the tubular portion 4 between the main body 1 and the movable body 5 and suitably selecting the diameter of the air vent hole (communication passage) 15, through which the space 4r communicates with the outside.

It should be noted that, instead of forming the air vent hole 15, the space 4r may be filled with a liquid, such as oil or coolant (cooling liquid), and a communication passage that allows the liquid to flow into the space 4r from the outside or flow out of the space 4r to the outside may be formed. Also with this configuration, the same advantageous effects can be obtained.

[Following Member According to Another Example]

Figure 6A:
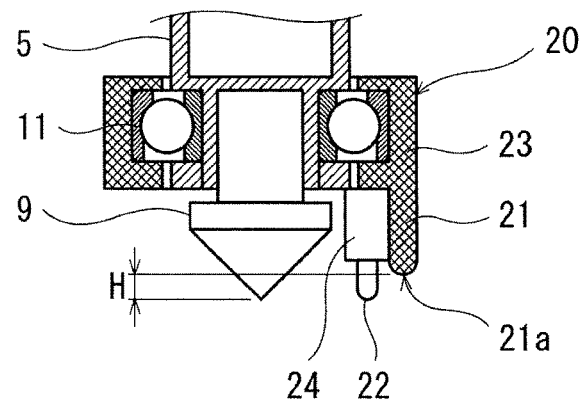
FIG. 6A is a schematic sectional side view of a following member according to another example.
Figure 6B:
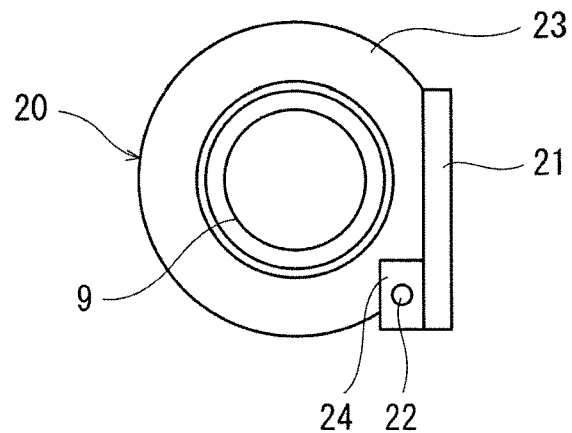
FIG. 6B is a schematic bottom view of the following member and a chamfering tool shown in FIG. 6A.
Figure 6C:
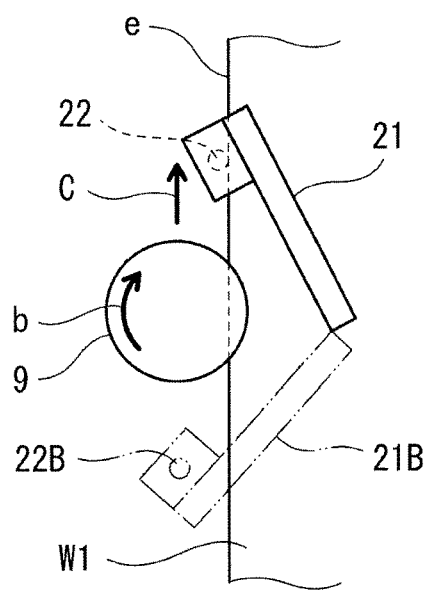
FIG. 6C is a schematic top view of an essential part of the following member and the chamfering tool when chamfering is performed by using the following member shown in FIG. 6A.

The present embodiment may include a following member 20 shown in FIGS. 6A to 6C instead of the above-described following member 10. FIG. 6A is a schematic sectional side view of the following member 20 according to another example. FIG. 6B is a schematic bottom view of the following member 20 and the chamfering tool 9 shown in FIG. 6A. FIG. 6C is a schematic top view of an essential part of the following member 20 and the chamfering tool 9 when chamfering is performed by using the following member 20 shown in FIG. 6A.

As shown in FIGS. 6A and 6B, the following member 20 includes: a bearing mounting portion 23 fixed to the outer ring of the bearing 11; a following portion 21 extending downward (in a direction toward the distal end) from a part of the bearing mounting portion 23, the following portion 21 being configured such that a distal end 21a thereof comes into contact with the surface of a workpiece to be chamfered; a pin mounting portion 24 fixed to the following portion 21; and a pin 22 mounted to the pin mounting portion 24. In this example, as shown in FIG. 6A, the distal end of the pin 22 projects further downward (in the direction toward the distal end) than the distal end 21a of the following portion 21.

As shown in FIG. 6C, when chamfering is performed on the edge e of the workpiece W1, for example, in such a manner that the chamfering tool 9 rotates in a direction indicated by arrow b and the chamfering proceeds in a direction indicated by arrow c along the edge e, the pin 22 comes into contact with a side face of the workpiece W1, the side face including the edge e, thereby preventing the following member 20 from rotating. This makes it possible to keep a state where the distal end 21a of the following portion 21 is in contact with the surface of the workpiece W1, and thereby a chamfering shape as designed can be achieved.

As shown in FIGS. 6B and 6C, the following portion 21 herein is formed in a straight shape. However, as an alternative example, the following portion 21 may be formed in an arc shape along the bearing mounting portion 23. As indicated by two-dot chain line in FIG. 6C, a following portion 21B and a rotation-prevention pin 22B similar to the following portion 21 and the rotation-prevention pin 22 may be further provided. In this case, for example, if the chamfering tool 9 rotates in a direction reverse to the direction indicated by arrow b and the chamfering proceeds in a direction reverse to the direction indicated by arrow c, the pin 22B comes into contact with the side face of the workpiece W1, the side face including the edge e, thereby preventing the following member 20 from rotating. In this case, the following portion 21 and the following portion 21B may be formed as a single continuous following portion.

As in the case of the above-described cylindrical portion 10a of the following member 10, if the distal end portion that comes into contact with the surface of the workpiece W1 is ring-shaped surrounding the outer periphery of the chamfering tool 9, then the function as the following member to come into contact with the surface of the workpiece W1 can be exerted regardless of the proceeding direction of the chamfering.

[Another Example Replacing Spline Shaft and Spline Nut]

Figure 7A:
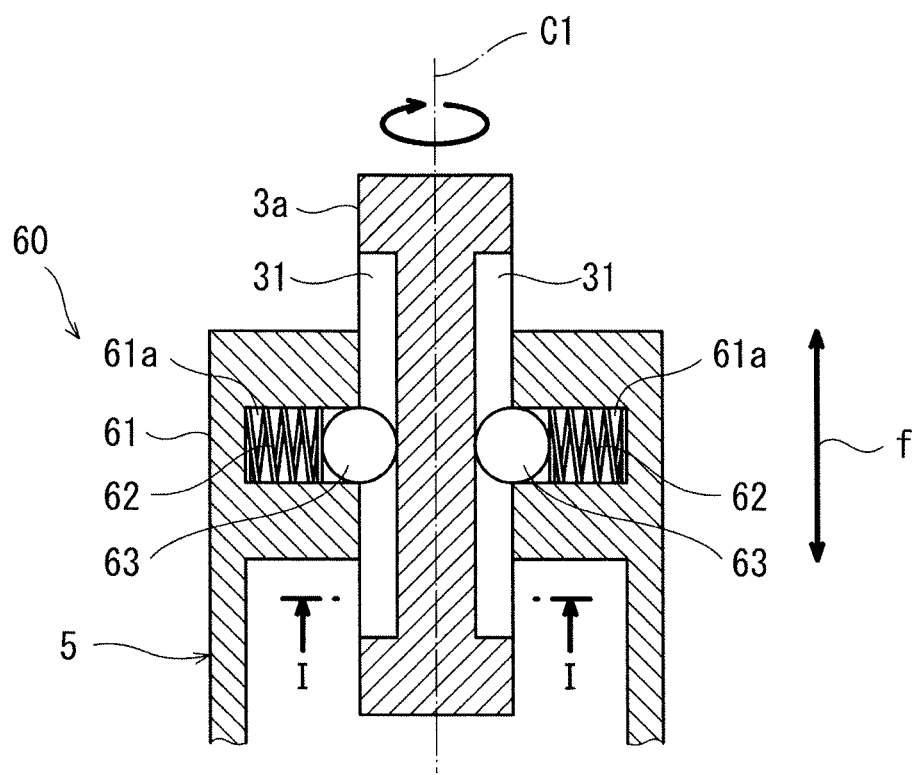
FIG. 7A is a schematic sectional side view of another example replacing a spline shaft and a spline nut.
Figure 7B:
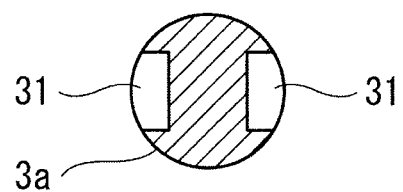
FIG. 7B is a sectional view of a shaft portion taken along line I-I of FIG. 7A.

FIG. 7A is a schematic sectional side view of another example replacing the spline shaft and the spline nut. FIG. 7B is a sectional view of a shaft portion 3a taken along line I-I of FIG. 7A.

In this example, the spline shaft 3 is replaced by the shaft portion 3a. Two grooves 31 each extending in the axis direction (i.e., the direction indicated by arrow f) are formed in the shaft portion 3a, such that the two grooves 31 face each other with the rotational axis C1 positioned therebetween. Here, the compression spring 8 (see FIG. 1), which is attached to the shaft portion 3a and urges the movable body 5 in a direction toward the distal end of the main body 1, is not shown.

The proximal end portion of the movable body 5 is provided with a shaft mounting portion 60, which replaces the spline nut 6. The shaft mounting portion 60 includes a mounting body portion 61, which is provided with a cylindrical through-hole in which the shaft portion 3a is inserted. The mounting body portion 61 is further provided with two side holes 61a, which face the two grooves 31 of the shaft portion 3a, respectively. A compression spring 62 is accommodated in each of the side holes 61a. Steel balls 63 are disposed such that each steel ball 63 straddles both the side hole 61a and the groove 31 of the shaft portion 3a.

Also with the above configuration, the proximal end portion of the movable body 5 is mounted to the shaft portion 3a, and the movable body 5 is configured to rotate together with the shaft portion 3a and be movable in the axis direction. It should be noted that a different configuration may be adopted, so long as the different configuration allows the movable body 5 to be mounted to the shaft portion, rotate together with the shaft portion, and be movable in the axis direction.

The following member may include a distal end portion that comes into contact with the surface of the workpiece, the distal end portion being ring-shaped surrounding the outer periphery of the chamfering tool.

According to this configuration, the function as the following member to come into contact with the surface of the workpiece can be exerted regardless of the proceeding direction of the chamfering.

The shaft portion may be configured as a spline shaft. The proximal end portion of the movable body, the proximal end portion being mounted to the shaft portion, may be configured as a spline nut.

The main body may include: a tubular portion disposed around the shaft portion and the urging member, the tubular portion being configured such that the movable body is fitted therein such that the movable body is slidable; and a communication passage through which a space formed inside the tubular portion between the main body and the movable body communicates with the outside, the communication passage allowing air or a liquid to flow into and out of the space.

According to this configuration, vibration caused by, for example, machining reaction force can be reduced by setting high the air tightness in the space formed inside the tubular portion between the main body and the movable body and suitably selecting the diameter of the communication passage, through which the space communicates with the outside.

From the foregoing description, numerous modifications and other embodiments of the present disclosure are obvious to a person skilled in the art. Therefore, the foregoing description should be interpreted only as an example and is provided for the purpose of teaching the best mode for carrying out the present disclosure to a person skilled in the art. The structural and/or functional details may be substantially altered without departing from the present disclosure.

The present disclosure is useful, for example, as a chamfering device and a chamfering method that make it possible to readily and precisely achieve an intended chamfering shape even if the workpiece varies in thickness, without requiring difficult tool orientation control.

What is claimed is:

1. A chamfering device configured to be attached to a rotatable main shaft of a machine tool and to extend, along a rotational axis of the main shaft, from a proximal end to an opposite distal end, the chamfering device comprising:
    a main body including, at a proximal end side thereof, a shank to be attached to the main shaft of the machine tool, the main body including, at a distal end side thereof, a shaft portion whose longitudinal axis extends in a direction of the rotational axis;
    a movable body whose proximal end portion is mounted to the shaft portion so as to receive the shaft portion therein, the movable body being configured to rotate together with the shaft portion and be movable relative to the main body in the rotational axis direction;
    an urging member configured to urge the movable body in a direction toward the distal end of the chamfering device;
    a chamfering tool mounted to a distal end portion of the movable body and configured to rotate together with the movable body to perform chamfering on an edge portion of a workpiece; and
    a following member mounted to the movable body such that a position of the following member relative to the movable body in the rotational axis direction is invariable and the following member is rotatable relative to the movable body, the following member being configured such that a distal end thereof comes into contact with a surface of the workpiece.

2. The chamfering device according to claim 1, wherein the following member includes a distal end portion that comes into contact with the surface of the workpiece, the distal end portion being ring-shaped and surrounding an outer periphery of the chamfering tool.

3. The chamfering device according to claim 1, wherein the shaft portion is configured as a spline shaft, and the proximal end portion of the movable body, the proximal end portion being mounted to the shaft portion, is configured as a spline nut.

4. The chamfering device according to claim 1, wherein the main body includes:
    a tubular portion disposed around the shaft portion and around the urging member, the tubular portion being configured such that the movable body is fitted therein such that the movable body is slidable; and
    a communication passage through which a space formed inside the tubular portion between the main body and the movable body communicates with an outside, the communication passage allowing air or a liquid to flow into and out of the space.

5. A chamfering method executed by using the chamfering device according to claim 1, the chamfering method comprising:
    performing cut-out processing of cutting a predetermined portion away from a plate-shaped piece of work by moving a cutting tool attached to the machine tool relative to the plate-shaped piece of work to form the workpiece; and then
    attaching the chamfering device, instead of the cutting tool, to the machine tool, and performing chamfering on the edge portion of the workpiece, the edge portion being formed when the predetermined portion is cut away from the piece of work, the chamfering being performed such that a movement path of the chamfering tool of the chamfering device as seen in the rotational axis direction coincides with a movement path of the cutting tool as seen in the rotational axis direction when the cut-out processing is performed.

* * * * *